(12) United States Patent
Dykesteen et al.

(10) Patent No.: US 7,133,786 B1
(45) Date of Patent: Nov. 7, 2006

(54) METHOD AND APPARATUS FOR MEASURING NONHOMOGENEOUS FLOW PHASE VELOCITIES

(75) Inventors: Eivind Dykesteen, Blomsterdalen (NO); Odd Petter Kalsaas, Søreidgrend (NO)

(73) Assignee: Roxar Flow Management AS, Bergen (NO)

( * ) Notice: Subject to any disclaimer, the term of this patent is extended or adjusted under 35 U.S.C. 154(b) by 0 days.

(21) Appl. No.: 11/148,111

(22) Filed: Jun. 8, 2005

(51) Int. Cl.
   *G01F 1/00* (2006.01)
   *G01N 11/00* (2006.01)

(52) U.S. Cl. .................................................. 702/50
(58) Field of Classification Search .................. 702/50
   See application file for complete search history.

(56) References Cited

U.S. PATENT DOCUMENTS

| | | | |
|---|---|---|---|
| 5,173,227 | A | 12/1992 | Ewen et al. |
| 5,259,239 | A | 11/1993 | Gaisford |
| 5,503,004 | A | 4/1996 | Agar |
| 5,597,961 | A * | 1/1997 | Marrelli .................. 73/861.04 |
| 5,608,170 | A | 3/1997 | Atkinson et al. |
| 5,922,611 | A | 7/1999 | Koelman et al. |
| 6,117,376 | A | 9/2000 | Merkel |
| 6,182,504 | B1 | 2/2001 | Gaisford |
| 6,234,030 | B1 * | 5/2001 | Butler ...................... 73/861.04 |
| 6,427,521 | B1 | 8/2002 | Jakkula et al. |
| 6,655,221 | B1 | 12/2003 | Aspelund et al. |
| 6,776,054 | B1 * | 8/2004 | Stephenson et al. ..... 73/861.63 |
| 2006/0037385 | A1 * | 2/2006 | Gysling ..................... 73/61.44 |

FOREIGN PATENT DOCUMENTS

| EP | 0 433 311 B1 | 4/1994 |
|---|---|---|
| NO | 307393 | 3/2000 |

OTHER PUBLICATIONS

Dykesteen, Eivind, "Comparison of Experience for Multiphase Metering in different Operations", IBC conference on Field applications & New Technologies for Multiphase Metering, Feb. 1999, 24 pages.

Anstey, N.A., "Correlation Techniques—A Review"; European Association of Exploration Geophysicists at Liege, Jun. 1964, 55-82.

Displacement Current, Wikipedia, the free encyclopedia, http://en.wikipedia.org/wiki/Displacement_current, 1 page.

(Continued)

*Primary Examiner*—John Barlow
*Assistant Examiner*—Cindy D. Khuu
(74) *Attorney, Agent, or Firm*—Seyfarth Shaw LLP (57) ABSTRACT

The present invention relates to a dual velocity method and apparatus for measuring flow rate of a fluid, independent of flow regime, the fluid having a plurality of components, at least one of which is capable of existing in an oil continuous phase emulsion in a conduit. The present invention only measures component fluid flow rates for components of the fluid which may include at least an oil continuous phase emulsion, but not a component including a water continuous phase emulsion. Velocity slip is directly determined by cross correlations of fluid electrical property signals which are used to measure the two most predominant velocities in a multiphase velocity distribution. Furthermore, phase velocity measurements are further improved by cross correlating signals from a pair of downstream sensors which are shifted a predetermined radial angle offset from corresponding pair of upstream diametrically positioned sensors.

17 Claims, 4 Drawing Sheets

OTHER PUBLICATIONS

Ampere's Law, Wikipedia, the free encyclopedia, http://en.wikipedia.org/wiki/Ampere's_law, 2 page.

Gauss's Law, Wikipedia, the free encyclopedia, http://en.wikipedia.org/wiki/Gauss's_law, 2 pages.

Permittivity, Wikipedia, the free encyclopedia, http://en.wikipedia.org/wiki/Permittivity, 2 pages.

Electric field, Wikipedia, the free encyclopedia, http://en.wikipedia.org/wiki/Electric_field, 2 pages.

Electromagnetic field, Wikipedia, the free encyclopedia, http://en.wikipedia.org/wiki/Lorentz_equation, 4 pages.

Maxwell's equations, Wikipedia, the free encyclopedia, http://en.wikipedia.org/wiki/Maxwell's_equations, 9 pages.

Green, R.G., et al, "Velocity and mass flow rate profiles of dry powders in a gravity drop conveyor using electrodynamic tomography system", Meas. Sci. Technol. 8, 1997, 429-436.

Karkkainen, Kimmo Kalervo, et al., "Effective Permittivity of Mixtures: Numerical Validation by the FDTD Method", IEEE Transactions on Geoscience and Remote Sensing, vol. 38, No. 3, May 2000, 1303-1308.

* cited by examiner

Main area of sensitivity for sensors 21a and 21b

FIGURE 4a

Main sensitivity area for sensors 21b and 23b

FIGURE 4b

Area for cross-correlation

FIGURE 4c

METHOD AND APPARATUS FOR MEASURING NONHOMOGENEOUS FLOW PHASE VELOCITIES

FIELD OF INVENTION

This invention generally relates to the field of flow meters for multiphase mixtures and more particularly for using a dual velocity method for measuring individual phase flow rates of multiphase oil, water and gas in an oil continuous phase emulsion mixture independent of flow regime and that are typically found in hydrocarbon boreholes.

BACKGROUND OF THE INVENTION

The measurement of fluid flow in particular during the production of an oil and gas well is important for proper monitoring and control of fluid from the reservoir.

The fluid in hydrocarbon boreholes generally flows through a conduit and the fluid normally comprises water, gas and oil in continuous and discontinuous phases. The gas and liquid are typically known to flow as bubble, churn, slug or annular flow generally depending on the gas flow rate relative to the liquid flow rate. The prior art discloses water cut meters which are devices for determining the water holdup in a producing well by measuring the capacitance or impedance of the fluid. The term is actually a misnomer because water cut is not the same as water holdup except in the unlikely case where all phases flow at the same velocity. Since hydrocarbons travel faster than water in a production well, the water holdup is larger than the water cut. However, a water cut meter has often been combined with a flowmeter so that the water cut could be estimated by combining the two measurements. The proportion of the total flow rate due to a fluid component is known as its cut. To determine in-situ flow rates, it is necessary to measure the holdup and velocity of each fluid component.

Total water in fluid flow from hydrocarbon boreholes generally comprises free water plus suspended water in an emulsion and dissolved water. Free water is completely separated from any emulsion and not dissolved. The amount of dissolved water is generally very low, e.g. in the range of 0.01%–0.1%, and is generally influenced by interfacial properties but only minimally effected by temperature and pressure. The water volume flow rate, relative to the total liquid (e.g. oil and water) flow rate, is known as water cut when standardized with respect to pressure and temperature. Water cut is generally expressed as a percentage.

Oil and water from oil wells typically flow in an emulsion which may be in two different forms. In one emulsion form, the oil is the continuous phase having water dispersed in the oil as droplets. The foregoing emulsion has insulating electrical properties wherein the dielectric constant of the oil continuous emulsion may be measured by a capacitance sensor. Another emulsion form comprises a water continuous phase having oil dispersed in the water as droplets. This emulsion form has electrically conductive properties wherein the conductivity of the water continuous emulsion may be measured by a conductive sensor. Therefore, the electrical properties of these two different types of emulsion forms are completely different even for instances when the water cut may be the same. The prior art typically measures electrical properties and densities of the phase and emulsion flows by methods known to those skilled in the art in order to determine corresponding flow rates, e.g. by using look-up tables.

The prior art also discloses methods and apparatus to determine component flow rates in a water continuous phase emulsion by using, for example, fluid conductivity measurements. Typically, the prior art discloses methods and apparatuses for measuring component flow rates in a fluid comprising oil continuous or water continuous emulsions which may switch from using capacitance sensors to conductive sensors at the instant a water continuous phase emulsion is detected by the flow meter apparatus.

In a vertical upward gas-liquid flow in a borehole conduit, the larger gas bubbles or slugs will rise in the fast moving liquid in the center of the conduit; other small bubbles will be near the wall of the conduit and will consequently move more slowly. This velocity slip is further enhanced by buoyancy due to the difference in density of gas and liquid so that the gas phase will be transported with a larger average velocity than the liquid phase. In order to measure multiphase flow rates, the prior art discloses the total velocity distribution of the flow must be measured in order to derive the flow rates from these measurements. If a flow meter apparatus does not take into account velocity slip, the volumetric measurements may be expected to be encumbered with a large degree of uncertainty.

Within a certain range of multiphase compositions and flow rates, the prior art discloses that an inline mixer may be employed in order to reduce the velocity slip to a minimum in an effort to create a radially homogeneous phase distribution at the location of a positioned multiphase flow meter apparatus in the borehole conduit. However, using an inline mixer has the following major drawbacks: the prior art does not disclose that a multiphase inline mixer exists that can create a homogeneous phase distribution over a sufficiently large range of flow rates for all the compositions that may be found in the field and thus, the range of a multiphase flow meter apparatus employing an inline mixer will be limited; pressure drops which may occur from using an inline mixer may be significant and detrimental to economic and process efficiency; an inline mixer may result in lost production by promoting emulsion formation; and use of an inline mixer increases measurement uncertainty.

The prior art also discloses derivation of empirical models whereby phase slip is related to measurable fluid parameters such as phase fractions and measured velocity adjusted to account for fluid temperature and pressure. However, the foregoing methodology has a disadvantage because a universal model covering all possible component composition scenarios and conditions encountered in the field is not possible. Furthermore, since flow regime is dependent on fluid property parameters such as pressure, viscosity and upstream configuration, a high uncertainty in slip determination occurs.

The prior art discloses a dual velocity method in order to avoid the use of inline mixing or empirical modeling to determine velocity slip. The dual velocity method directly measures velocity slip by measuring the two most predominant velocities in a multiphase velocity distribution, by measuring the velocity of a pseudo-homogenous dispersed phase and by measuring the average velocity of the gas flowing as large slugs.

SUMMARY OF THE INVENTION

The present invention provides a method and apparatus for utilizing a dual velocity technique for measuring flow rate of a fluid, independent of flow regime, the fluid having a plurality of components, at least one of which is capable of existing in an oil continuous phase emulsion in a conduit.

The method comprises measuring and outputting fluid electrical property signals, optimizing their accuracy, solving at a predetermined period of time a first predetermined mathematical relationship between the measured and optimized fluid electrical property signals and component fractions in the emulsion to determine water cut.

Dispersed phase fluid velocity may determined by cross-correlating signals from a first pair of near conduit wall sensitive, diametrically positioned sensors with the periodic signals from a second pair of near conduit wall sensitive, diametrically positioned sensors. Similarly, free gas phase or slug velocity is determined by cross-correlating the signals from a first pair of conduit cross-sectional sensitive, diametrically positioned sensors with the signals from a second pair of conduit cross-sectional sensitive, diametrically positioned sensors.

A second predetermined mathematical relationship between the measured fluid electrical property signals is solved to determine a dispersed gas fraction. A third predetermined mathematical relationship between dispersed gas fraction and water cut is used to determine dispersed water fraction. A fourth predetermined mathematical relationship between the measured fluid electrical property signals is used to determine free gas fraction. The fraction of time the fluid flow is in slug flow may then be determined. A fifth predetermined mathematical relationship between the component phase fractions, the fraction of time the fluid is in slug flow and a predetermined pipe characteristic is then used to determine fluid component volumetric flow rates.

The measurement of fluid electrical property signals may occur continuously or substantially continuously. The accuracy of the measured fluid electrical properties may be optimized by using small electrode spatial filtering near a periphery of the interior of the conduit. A downstream second pair of diametrically positioned sensors may be shifted a predetermined radial angle offset, e.g. ninety degrees, from a corresponding upstream first pair of diametrically positioned sensors to improve a cross-correlation to determine a gas slug velocity or a dispersed phase fluid velocity.

Water cut determination may be optimized by using a predetermined offset value, by using a predetermined calibration method or by using time series analysis methods.

DESCRIPTION OF EXEMPLARY
EMBODIMENTS OF THE INVENTION

Figure 1A:
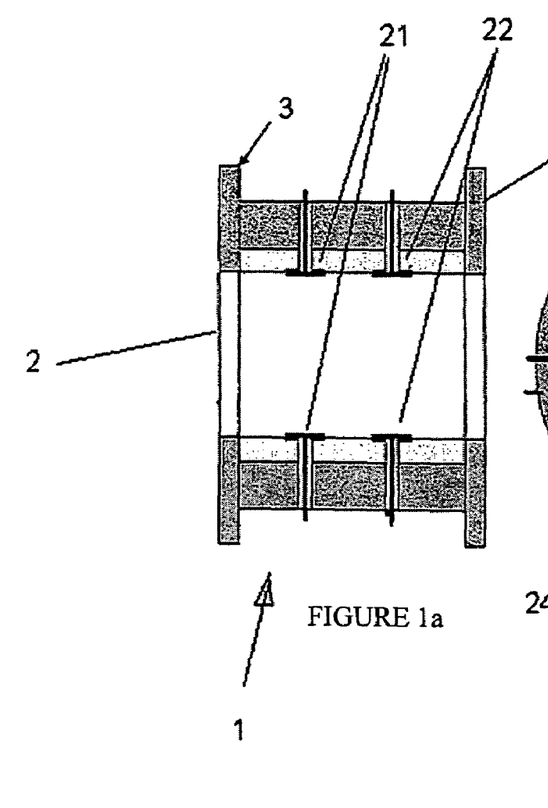
FIG. 1 is an exemplary embodiment of the present invention.
Figure 1B:
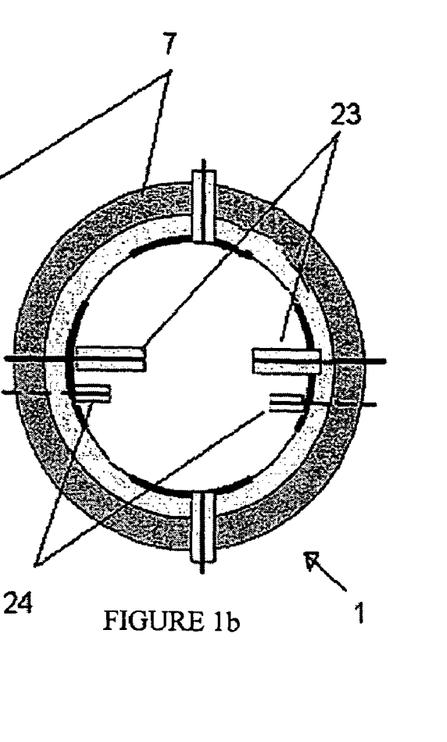
Figure 2:
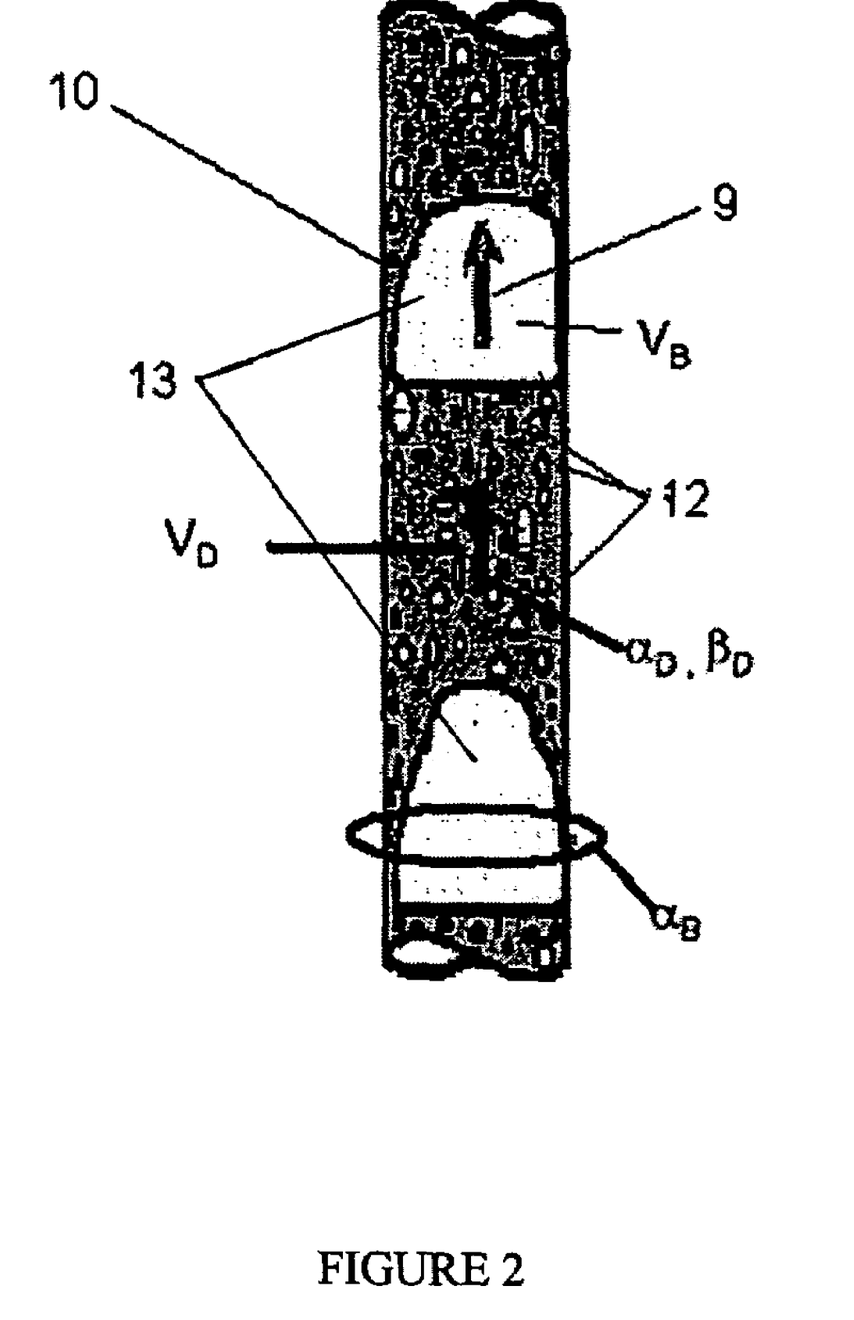
FIG. 2 is a partial cutaway view schematically showing a representation of vertical three phase fluid component flow inside a borehole conduit.

Referring generally to FIG. 1a and FIG. 1b, flow meter apparatus 1 is adapted for measuring flow rate of a fluid, independent of flow regime, within conduit 10 (FIG. 2). The fluid has a plurality of components, at least one of which is capable of existing in an oil continuous phase emulsion in conduit 10.

Flow meter apparatus 1 comprises through-piece 2 having a predetermined length, a plurality of sensors, generally referred to herein as "20," and sensor housing 7. As used herein, sensors 20 comprise sensors 21, 22, 23, and 24.

Through-piece 2 is adapted to be attached longitudinally to conduit 10 (FIG. 2). The actual attachment to conduit 10 may be by any of the methods commonly known in the art such as by use of flange 3, a weld, or the like, or a combination thereof.

In a preferred embodiment, sensors 20 comprise four different pairs of sensors 20, e.g. sensors 21, 22, 23, and 24. A first pair of near conduit wall sensitive, diametrically positioned sensors 21 are adapted to detect a first electrical property of fluid within conduit 10 (FIG. 2). A second pair of near conduit wall sensitive, diametrically positioned sensors 22 are adapted to detect a second electrical property of the fluid within conduit 10. The second pair of near wall, diametrically positioned sensors 22 are typically positioned a first predetermined distance from the first pair of the near wall, diametrically positioned sensors 21. In certain embodiments, the first and second electrical properties may be the same electrical property.

Referring more specifically to FIG. 1b, a first pair of conduit cross-sectional sensitive, diametrically positioned sensors 23 are adapted to detect a third electrical property of the fluid within conduit 10 (FIG. 2). A second pair of conduit cross-sectional sensitive, diametrically positioned sensors 24 are adapted to detect a fourth electrical property of the fluid within conduit 10. The second pair of cross-sectional, diametrically positioned sensors 24 are positioned a second predetermined distance from the first pair of the cross-sectional, diametrically positioned sensors 23. In certain embodiments, the third and fourth electrical properties may be the same electrical property and may additionally be the same as either the first and/or second electrical property. In preferred embodiments, permittivity is the desired fluid electrical property.

Sensor housing 7 is typically disposed at least partially circumferentially about a predetermined portion of through-piece 2. Sensor housing 2 is adapted to provide access into an interior wall of conduit 10 (FIG. 2), typically to provide access for sensors 20. In a preferred embodiment, sensor housing 7 is further adapted to electrically insulate sensors 20 from sensor housing 7.

In the operation of an exemplary embodiment, referring to FIG. 2, conduit 10, e.g. a bore hole conduit, has fluid flow as indicated by directional flow vector 9. Fluid flowing close to an inside wall of conduit 10 will be predominantly a liquid having gas 12 dispersed within the liquid. Large, gas slugs 13 will tend to concentrate in the middle of conduit 10. In particular, this will be the case for time periods in between the flow of gas slugs 13 within conduit 10.

Sensors 20 (FIG. 1a), e.g. sensors 21 or 22 (FIG. 1a) which may be capacitance sensors, may generally be used to measure the dielectric constant of the fluid in conduit 10. Since the dielectric constant of water is high (about 80) and that of oil and gas is low (in the range of 1–6), sensors 21 or 22 may be used to determine the fluid emulsion type, e.g. whether it is oil continuous or water continuous. The difference between oil continuous or water continuous dielectric values is great, making a sensor such as a capacitance sensor very sensitive to small amounts of water present in a fluid flow.

Figure 3:
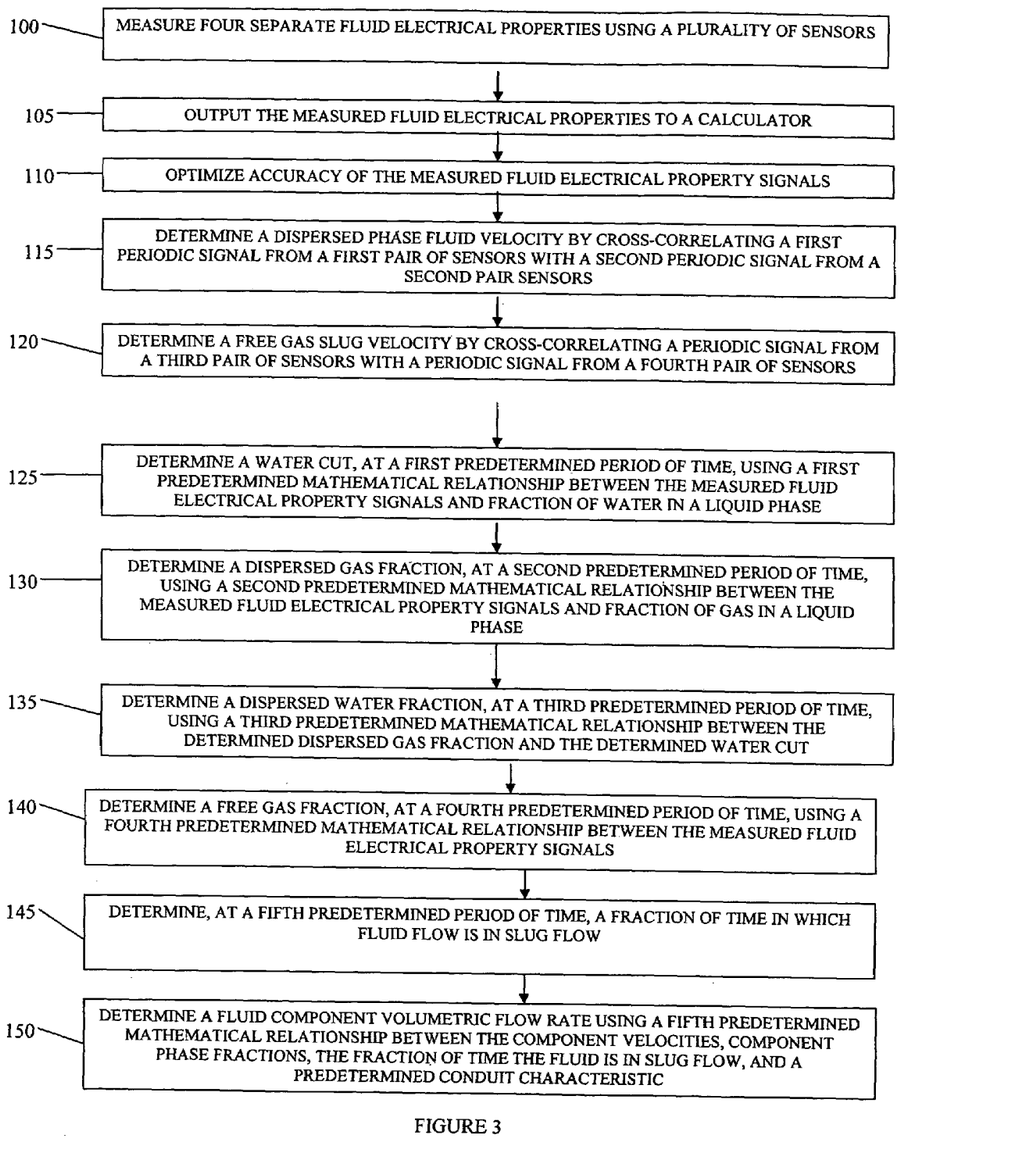
FIG. 3 is a flowchart of an exemplary method embodiment.
Figure 4A:
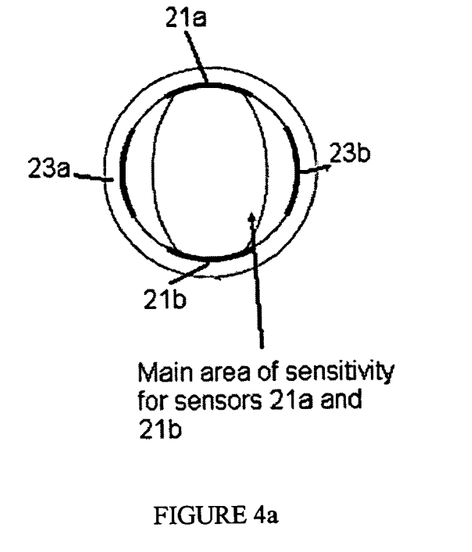
FIGS. 4a–4c are illustrations of areas used for cross-correlation in an exemplary embodiment.
Figure 4B:
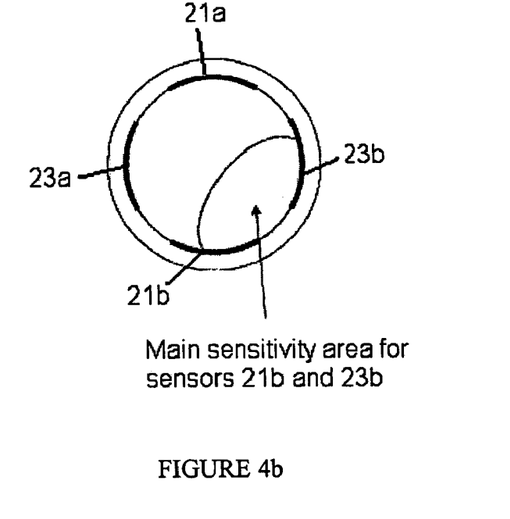
Figure 4C:
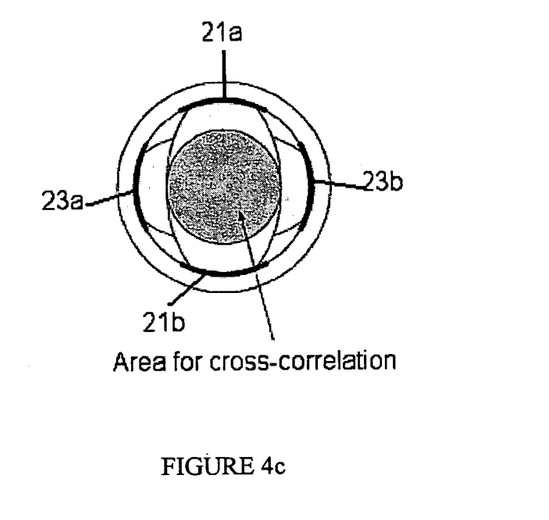

In a preferred embodiment, referring now to FIG. 3, flow rate of a fluid within a conduit may be measured, independent of flow regime, using the methods of the present invention. The fluid may have a plurality of components where at least one of the plurality of components is capable of existing in an oil continuous phase emulsion in the conduit. This may be a dual velocity method for measuring flow rate of the fluid, independent of flow regime. In general, a dispersed phase fluid velocity may be determined by cross-correlating one or more periodic signals from first pair of near conduit wall sensitive, diametrically positioned sensors 21 with one or more periodic signals from a second pair of near conduit wall sensitive, diametrically positioned sensors 22 (FIG. 1*a*) FIGS. 4*a*–4*c* illustrate areas of sensitivity and area for cross-correlation of an exemplary embodiment.

Four separate fluid electrical properties are measured using a plurality of sensors 20 (FIGS. 1*a*, 1*b*). (Step 100) As noted above, these separate fluid electrical properties may be the same fluid electrical property or may be a combination of fluid electrical properties that have some overlap, i.e. not all of the four separate fluid electrical properties may be unique. Measuring the four separate fluid electrical properties may further comprise measuring the first fluid electrical property upstream signal from a first pair of near conduit wall sensitive, diametrically positioned sensors; measuring the second fluid electrical property signal from a second pair of near conduit wall sensitive, diametrically positioned sensors positioned a first predetermined distance downstream from the first pair of near conduit wall sensitive diametrically positioned sensors; measuring the third fluid electrical property upstream signal from a first pair of conduit cross-sectional sensitive, diametrically positioned sensors; and measuring the fourth fluid electrical property signal from a second pair of conduit cross-sectional sensitive, diametrically positioned sensors positioned a second predetermined distance downstream from the first pair of cross-sectional conduit sensitive diametrically positioned sensors. The measurement of the fluid electrical property signal may occur either continuously or substantially continuously.

The measured fluid electrical properties are output or otherwise made accessible to a calculator, e.g. a computer. (Step 105)

Accuracy of the measured fluid electrical property signals may then be optimized such as by using small electrode spatial filtering near a periphery of an interior of conduit 10. (Step 110)

A dispersed phase fluid velocity may be determined by cross-correlating a first periodic signal from a first pair of sensors with a second periodic signal from a second pair sensors. (Step 115) The dispersed phase fluid velocity may be determined by cross-correlating a periodic signal from the first pair of near conduit wall sensitive diametrically positioned sensors with a periodic signal from the second pair of near conduit wall sensitive diametrically positioned sensors.

A free gas slug velocity may be determined by cross-correlating a periodic signal from a third pair of sensors with a periodic signal from a fourth pair of sensors. (Step 120) The free gas slug velocity may be determined by cross-correlating a periodic signal from the first pair of cross-sectional conduit sensitive diametrically positioned sensors with a periodic signal from the second pair of cross-sectional conduit sensitive diametrically positioned sensors.

A water cut may be determined, at a first predetermined period of time, using a first predetermined mathematical relationship between the measured fluid electrical property signals and fraction of water in a dispersed phase. (Step 125) Determination of the water cut may be optimized by a predetermined offset value, a predetermined calibration method, a time series analysis, or the like, or a combination thereof.

A dispersed gas fraction is determined, at a second predetermined period of time, using a second predetermined mathematical relationship between the measured fluid electrical property signals. (Step 130)

A dispersed water fraction is determined, at a third predetermined period of time, using a third predetermined mathematical relationship between the determined dispersed gas fraction and the determined water cut. (Step 135)

A free gas fraction is determined, at a fourth predetermined period of time, using a fourth predetermined mathematical relationship between the measured fluid electrical property signals. (Step 140)

At a fifth predetermined period of time, a fraction of time is determined in which fluid flow is in slug flow. (Step 145) A fluid component volumetric flow rate is determined using a fifth predetermined mathematical relationship between the component phase fractions, the fraction of time the fluid is in slug flow, and a predetermined conduit characteristic. (Step 150)

The fluid component volumetric flow rate may be output to another process in the calculator, to a display, to a printer, or the like, or a combination thereof.

A second pair of diametrically positioned sensors may be shifted by a predetermined radial angle offset from the upstream first pair of diametrically positioned sensors, e.g. ninety degrees.

The actual sequence of terminations may differ. For example, another possible sequence of steps could be steps 100, 105, 110, 125, 130, 135, 140, 145, 115, 120, 150.

In a preferred method, only component fluid flow rates for components of the fluid which may comprise at least an oil continuous phase emulsion are measured, but not a component comprising a water continuous phase emulsion. The liquid emulsion phase type may be determined by the method as disclosed in U.S. Pat. No. 6,182,504 wherein emulsion type is determined by comparing the calculated water fraction solutions associated with the oil and water continuous emulsion solutions of a first mathematical relationship, e.g. the Bruggeman equation relating emulsion dielectric constant to composition or the equations of Wiener, Böttcher, Boyle, Kubo-Nakamura or similar, and selecting the most reasonable solution. This approach to determining emulsion type makes it possible to accurately measure water content ranging from 0% to 100% using devices that measure emulsion electrical properties. For example, the Bruggeman equation may be used for an oil continuous emulsion as shown below:

$$\beta_L = 1 - \frac{\varepsilon_W - \varepsilon_L}{\varepsilon_W - \varepsilon_O}\left(\frac{\varepsilon_O}{\varepsilon_L}\right)^{\frac{1}{3}} \tag{1}$$

where:
$\beta_L$=water cut (volume fraction of water to liquid ratio)
$\varepsilon_O$=permittivity of the oil
$\varepsilon_W$=permittivity of the water
$\varepsilon_L$=permittivity of the oil continuous emulsion In a preferred embodiment, a water cut is determined using a first predetermined mathematical relationship, i.e. the Bruggeman equation, although other standard two-phase mixture equations may be used as well (e.g., Boyle, or similar). If no gas is present in the dispersed phase near the pipe wall, the water cut is determined using the Bruggman equation and the measured fluid electrical properties, e.g., permittivity, from a near conduit wall sensor 21 or 22 (FIG.

1a) will be accurate. However, there will normally be a certain amount of gas present in the dispersed phase near the wall of conduit 10 (FIG. 2) and the actual water cut will be slightly offset from the first calculated value from using a measured permittivity in the Bruggeman equation. Because the permittivity of gas is lower than that of oil, the offset in water cut will always be positive. This follows from standard two-phase permittivity formulas: the more gas there is in the dispersed phase sample, the lower the measured the measured capacitance, and hence the permittivity will be. The true water cut of the dispersed phase will normally, therefore, be higher than that calculated by the first predetermined mathematical relationship, e.g. the Bruggman equation.

There are several optional methods available to optimize permittivity measurements of a dispersed phase with close to zero gas. Several such methods are explained in the art, e.g. Norwegian Patent No. 307393, and include capturing the highest capacitance value within a time series, or an average or a moving average of high values.

In an embodiment, optimization may occur such as by using spatial filtering using small electrodes in which a sensitivity area of sensors 20, e.g. sensors 21 and 22 in FIG. 1, is aimed near the wall of conduit 10 (FIG. 2). Using the foregoing methods to determine water cut for a dispersed phase with close to no gas present, the offset in measured water cut will be very small, and typically within uncertainty limits required for multiphase conduit bore hole monitoring purposes.

The prior art discloses that correct water cut is typically offset by a constant value that may be obtained by calibration, or may be estimated based on experience. Water cut determination may further be improved by also adding an additional value that depends on the permittivity variations, e.g. the statistical variance, in the actual flow.

In an embodiment, the second predetermined mathematical relationship may be as follows:

$$a_D = 1 - \frac{\varepsilon_G - \varepsilon_D}{\varepsilon_G - \varepsilon_L}\left(\frac{\varepsilon_L}{\varepsilon_D}\right)^{\frac{1}{3}} \quad (2)$$

where:
- $\alpha_D$=dispersed gas fraction (FIG. 2)
- $\epsilon_G$=permittivity of the gas
- $\epsilon_D$=permittivity of the dispersed gas fraction
- $\epsilon_L$=permittivity of the oil continuous emulsion.

From these parameters, the dispersed water fraction, $\beta_D$, may be calculated as follows:

$$\beta_L = \beta_D/(\beta_D + \gamma_D) \quad (3)$$

which can be rearranged to $$\gamma_D = (\beta_D/\beta_L) - \beta_D \quad (4)$$

The sum of fractions will equal 1, i.e.:

$$\alpha_D + \beta_D + \gamma_D = 1 \quad (5)$$

Substituting (4) in (5) and rearranging, a third predetermined mathematical relationship to determine dispersed water fraction that may be used is (see FIG. 2):

$$\beta_D = (1 - \alpha_D)^* \beta_L \quad (6)$$

Often a measured flow is inhomogeneous, meaning that in periods there will be larger gas bubbles or slugs flowing through the measuring apparatus. The present method determines free gas phase or slug fraction, $\alpha_B$, in order to obtain the correct gas flow rate. The slug fraction may be determined by analyzing the capacitance time series over a certain period of time, and by using, for example, a two phase permittivity formulae. The average permittivity for the time period then represents the permittivity $\epsilon_M$ of the bulk multiphase mixture over the selected time period. Applying a two-phase permittivity formulae once more, the two-phase mixture is now considered as a mixture of the dispersed phase having a permittivity of $\epsilon_D$, and the large gas bubbles or slugs having a permittivity of $\epsilon_G$. Following the same procedure as previously described, the free gas fraction $\alpha_B$ may be determined from $\epsilon_D$, $\epsilon_G$ and the measure bulk permittivity $\epsilon_M$ using a fourth predetermined mathematical relationship such as:

$$a_B = 1 - \frac{\varepsilon_G - \varepsilon_M}{\varepsilon_G - \varepsilon_D}\left(\frac{\varepsilon_D}{\varepsilon_M}\right)^{\frac{1}{3}} \quad (7)$$

Free gas bubbles or slugs travel with a velocity ($V_B$) different from that of the dispersed phase ($V_D$). In a given time period T, a certain fraction $T_B$ of that time will be dominated by the large, "slug" bubbles and proportional to the free gas fraction. Flow rates in a pipeline with flow area "A" can now be calculated from a fifth predetermined mathematical relationship resulting in the following formulas:

Volume Flow Rate of Gas:

$$Q_G = \frac{T_B}{T}A(\alpha_B V_B + (1-\alpha_B)\alpha_D V_D) + \left(1 - \frac{T_B}{T}\right)A(\alpha_D V_D) \quad (8)$$

Volume Flow Rate of Total Liquid:

$$Q_L = \frac{T_B}{T}A((1-\alpha_B)(1-\alpha_D)V_D) + \left(1 - \frac{T_B}{T}\right)A(1-\alpha_D)V_D \quad (9)$$

Other relevant measurements may then be determined as follows:

Volume Flow Rate of Water and Oil $$Q_W = \beta_L^* Q_L \quad (10)$$

Volume Flow Rate of Oil:

$$Q_O = (1-\beta_L)^* Q_L \quad (11)$$

It will be understood that various changes in the details, materials, and arrangements of the parts which have been described and illustrated above in order to explain the nature of this invention may be made by those skilled in the art without departing from the principle and scope of the invention as recited in the appended claims.

What is claimed is:

1. A method for measuring flow rate of a fluid within a conduit, independent of flow regime, the fluid having a plurality components where at least one of the plurality of components is capable of existing in an oil continuous phase emulsion in the conduit, the method comprising:
   a. measuring four separate fluid electrical properties using a plurality of sensors;
   b. outputting the measured fluid electrical properties to a calculator;

c. optimizing accuracy of the measured fluid electrical property signals;

d. determining a dispersed phase fluid velocity by cross-correlating a first periodic signal from a first pair of sensors with a second periodic signal from a second pair sensors;

e. determining a free gas slug velocity by cross-correlating a periodic signal from a third pair of sensors with a periodic signal from a fourth pair of sensors;

f. determining a water cut, at a first predetermined period of time, using a first predetermined mathematical relationship between the measured fluid electrical property signals and fraction of water in a dispersed phase;

g. determining a dispersed gas fraction, at a second predetermined period of time, using a second predetermined mathematical relationship between the measured fluid electrical property signals;

h. determining a dispersed water fraction, at a third predetermined period of time, using a third predetermined mathematical relationship between the determined dispersed gas fraction and the determined water cut;

i. determining a free gas fraction, at a fourth predetermined period of time, using a fourth predetermined mathematical relationship between the measured fluid electrical property signals;

j. determining, at a fifth predetermined period of time, a fraction of time in which fluid flow is in slug flow;

k. determining a fluid component volumetric flow rate using a fifth predetermined mathematical relationship between the component phase fractions, the fraction of time the fluid is in slug flow, and a predetermined conduit characteristic; and l. outputting the fluid component volumetric flow rate to at least one of a calculator, a computer, a display and a printer.

2. The method of claim 1, wherein measuring the four separate fluid electrical properties further comprises:

a. measuring the first fluid electrical property upstream signal from a first pair of near conduit wall sensitive, diametrically positioned sensors;

b. measuring the second fluid electrical property signal from a second pair of near conduit wall sensitive, diametrically positioned sensors positioned a first predetermined distance downstream from the first pair of near conduit wall sensitive diametrically positioned sensors;

c. measuring the third fluid electrical property upstream signal from a first pair of conduit cross-sectional sensitive, diametrically positioned sensors; and d. measuring the fourth fluid electrical property signal from a second pair of conduit cross-sectional sensitive, diametrically positioned sensors positioned a second predetermined distance downstream from the first pair of cross-sectional conduit sensitive diametrically positioned sensors.

3. The method of claim 2, wherein:

a. the dispersed phase fluid velocity is determined by cross-correlating a periodic signal from the first pair of near conduit wail sensitive diametrically positioned sensors with a periodic signal from the second pair of near conduit wall sensitive diametrically positioned sensors; and b. the free gas slug velocity is determined by cross-correlating a periodic signal from the first pair of cross-sectional conduit sensitive diametrically positioned sensors with a periodic signal from the second pair of cross-sectional conduit sensitive diametrically positioned sensors.

4. The method of claim 1, further comprising outputting the fluid component volumetric flow rate to at least one of (a) another process, (b) a display, or (c) a printer.

5. The method of claim 1, wherein determination of the water cut is optimized by at least one of (i) a predetermined offset value, (ii) a predetermined calibration method, or (iii) a time series analysis.

6. The method of claim 1, wherein the accuracy of the measured fluid electrical properties is optimized by using small electrode spatial filtering near a periphery of an interior of the conduit.

7. A dual velocity method for measuring flow rate of a fluid, independent of flow regime, the fluid comprising a plurality of components, at least one of the plurality of components being capable of existing in an oil continuous phase emulsion in a conduit, the method comprising:

a. measuring, at a first predetermined time, a first fluid electrical property upstream signal from a first pair of near conduit wall sensitive, diametrically positioned sensors;

b. measuring, at a second predetermined time, a second fluid electrical property signal from a second pair of near conduit wall sensitive, diametrically positioned sensors positioned a first predetermined distance downstream from the first pair of near conduit wall sensitive diametrically positioned sensors;

c. measuring, at a predetermined time, a third fluid electrical property upstream signal from a first pair of conduit cross-sectional sensitive, diametrically positioned sensors;

d. measuring, at a predetermined time, a fourth fluid electrical property signal from a second pair of conduit cross-sectional sensitive, diametrically positioned sensors positioned a second predetermined distance downstream from the first pair of cross-sectional conduit sensitive diametrically positioned sensors;

e. optimizing the accuracy of the measured fluid electrical property signals;

f. determining a water cut, at a predetermined period of time, using a first predetermined mathematical relationship between the measured fluid electrical property signals and a fraction of water in a dispersed phase;

g. determining a dispersed phase fluid velocity by cross-correlating a periodic signal from the first pair of near conduit wall sensitive diametrically positioned sensors with a periodic signal from the second pair of near conduit wall sensitive diametrically positioned sensors;

h. determining a free gas slug velocity by cross-correlating a periodic signal from the first pair of cross-sectional conduit sensitive diametrically positioned sensors with a periodic signal from the second pair of cross-sectional conduit sensitive diametrically positioned sensors;

i. determining a dispersed gas fraction, at a predetermined period of time, using a second predetermined mathematical relationship between the measured fluid electrical property signals;

j. determining a dispersed water fraction, at a predetermined period of time, using a third predetermined mathematical relationship between the dispersed gas fraction and the water cut;

k. determining a free gas fraction, at a predetermined period of time, using a fourth predetermined mathematical relationship between the measured fluid electrical property signals;

l. determining a fraction of time during which fluid flow is in slug flow;

m. determining a fluid component volumetric flow rate using a fifth predetermined mathematical relationship between the component phase fractions, the fraction of time the fluid is in slug flow, and a predetermined conduit characteristic; and n. outputting the fluid component volumetric flow rate to at least one of a calculator, a computer, a display and a printer.

8. The method of claim 7, further comprising outputting the fluid component volumetric flow rate to at least one of (a) another process, (b) a display, or (c) a printer.

9. The method of claim 7 wherein at least one measurement of a fluid electrical property signal occurs at least one of (i) continuously or (ii) substantially continuously.

10. The method of claim 7, wherein:

a. The first mathematical equation is $$\beta_L = 1 - \frac{\varepsilon_W - \varepsilon_L}{\varepsilon_W - \varepsilon_O}\left(\frac{\varepsilon_O}{\varepsilon_L}\right)^{\frac{1}{3}};$$

b. The second mathematical equation is $$a_D = 1 - \frac{\varepsilon_G - \varepsilon_D}{\varepsilon_G - \varepsilon_L}\left(\frac{\varepsilon_L}{\varepsilon_D}\right)^{\frac{1}{3}};$$

c. The third mathematical equation is $\beta_D = (1-\alpha_D)*\beta_L$; and d. The fourth mathematical equation is $$a_B = 1 - \frac{\varepsilon_G - \varepsilon_M}{\varepsilon_G - \varepsilon_D}\left(\frac{\varepsilon_D}{\varepsilon_M}\right)^{\frac{1}{3}}.$$

11. The method of claim 7 further comprising shifting a second pair of diametrically positioned sensors a predetermined radial angle offset from the upstream first pair of diametrically positioned sensors.

12. The method of claim 11, wherein the predetermined radial angle offset is ninety degrees.

13. The method of claim 7, wherein the determination of water cut is optimized by at least one of (i) a predetermined offset value, (ii) a predetermined calibration method, or (iii) a time series analysis.

14. The method of claim 7, wherein the accuracy of the measured fluid electrical properties is optimized by using small electrode spatial filtering near a periphery of the interior of the conduit.

15. The method of claim 7, wherein:

a. the volume flow rate of gas is calculated using the formula $$Q_G = \frac{T_B}{T}A(a_B V_B + (1-\alpha_B)\alpha_D V_D) + \left(1 - \frac{T_B}{T}\right)A(\alpha_D V_D);$$

b. the volume flow rate of total liquid is calculated as $$Q_L = \frac{T_B}{T}A((1-\alpha_B)(1-\alpha_D)V_D) + \left(1 - \frac{T_B}{T}\right)A(1-\alpha_D)V_D;$$

c. the volume flow rate of water and oil is calculated using the formula $Q_W = \beta_L * Q_L$; and d. the volume flow rate of oil is calculated using the formula $Q_O = (1-\beta_L)*Q_L$.

16. A flow meter apparatus adapted to measure a flow rate of a fluid in a conduit, independent of flow regime, the fluid having a plurality of components, at least one of the plurality of components being capable of existing in an oil continuous phase emulsion, the flow meter apparatus comprising:

a. a through-piece comprising a predetermined length and adapted to be attached longitudinally to a conduit;

b. a first pair of near conduit wall sensitive, diametrically positioned sensors adapted to detect a first predetermined electrical property of a fluid within the conduit;

c. a second pair of near conduit wall sensitive, diametrically positioned sensors adapted to detect a second predetermined electrical property of the fluid within the conduit, the second pair of near wall, diametrically positioned sensors being positioned a first predetermined distance from the first pair of the near wall, diametrically positioned sensors;

d. a first pair of conduit cross-sectional sensitive, diametrically positioned sensors adapted to detect a third predetermined electrical property of the fluid within the conduit; and e. a second pair of conduit cross-sectional sensitive, diametrically positioned sensors adapted to detect a fourth predetermined electrical property of the fluid within the conduit, the second pair of cross-sectional, diametrically positioned sensors being positioned a second predetermined distance from the first pair of the cross-sectional, diametrically positioned sensors; and f. a sensor housing disposed at least partially circumferentially about a predetermined portion of the through-piece, the sensor housing adapted to provide access into an interior wall of the conduit for the sensors, the sensor housing further adapted to electrically insulate the sensors from the sensor housing.

17. The apparatus of claim 16, wherein then through-piece is attached to the conduit by at least one of (i) a flange or (ii) a weld.

* * * * *